US012770906B2

(12) United States Patent
Lee et al.

(10) Patent No.: US 12,770,906 B2
(45) Date of Patent: Oct. 20, 2026

(54) SECONDARY BATTERY MANUFACTURING APPARATUS AND SECONDARY BATTERY MANUFACTURING METHOD USING SAME

(71) Applicant: LG Energy Solution, Ltd., Seoul (KR)

(72) Inventors: Jin Yong Lee, Daejeon (KR); Hae Ho Hwang, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 974 days.

(21) Appl. No.: 17/920,972

(22) PCT Filed: Aug. 13, 2021

(86) PCT No.: PCT/KR2021/010798
§ 371 (c)(1),
(2) Date: Oct. 24, 2022

(87) PCT Pub. No.: WO2022/139107
PCT Pub. Date: Jun. 30, 2022

(65) Prior Publication Data
US 2023/0170515 A1 Jun. 1, 2023

(30) Foreign Application Priority Data
Dec. 24, 2020 (KR) ........................ 10-2020-0183968

(51) Int. Cl.
*H01M 10/04* (2006.01)
*H01M 50/105* (2021.01)

(52) U.S. Cl.
CPC ..... *H01M 10/0404* (2013.01); *H01M 10/049* (2013.01); *H01M 50/105* (2021.01)

(58) Field of Classification Search
CPC ........... H01M 10/0404; H01M 10/049; H01M 50/105; Y02E 60/10; Y02P 70/50
See application file for complete search history.

(56) References Cited

U.S. PATENT DOCUMENTS

2016/0380245 A1 12/2016 Kang
2019/0027714 A1 1/2019 Jung et al.
2019/0044099 A1 2/2019 Kang
(Continued)

FOREIGN PATENT DOCUMENTS

CN 106816559 A 6/2017
CN 208336285 U 1/2019
(Continued)

OTHER PUBLICATIONS

"Woo et al., KR-20180028200-A—Machine Translated, Mar. 16, 2018" (Year: 2018).*
(Continued)

*Primary Examiner* — Nicholas P D'Aniello
*Assistant Examiner* — Jesse J Efymow
(74) *Attorney, Agent, or Firm* — Lerner David LLP

(57) ABSTRACT

A secondary battery manufacturing apparatus includes: a fixed plate on which one side of a pouch film is placed; a rotating plate which is provided on a side surface of the fixed plate and on which the other side of the pouch film is placed; and a rotation driving part which is coupled to the rotating plate and rotates the rotating plate to be above the fixed plate. The rotating plate is rotated by the rotation driving part as well as linearly moved toward the fixed plate.

8 Claims, 7 Drawing Sheets

(56) References Cited

U.S. PATENT DOCUMENTS

| | | | | |
|---|---|---|---|---|
| 2019/0393455 | A1 | 12/2019 | Seo et al. | |
| 2020/0067029 | A1 | 2/2020 | Park et al. | |
| 2020/0185668 | A1 | 6/2020 | Levin | |
| 2020/0280044 | A1 | 9/2020 | Park et al. | |
| 2020/0365836 | A1 | 11/2020 | Jung et al. | |
| 2020/0403191 | A1 | 12/2020 | Kang | |
| 2021/0066676 | A1 | 3/2021 | Jung et al. | |
| 2021/0344067 | A1 | 11/2021 | Kang | |
| 2022/0029192 | A1 | 1/2022 | Lee et al. | |
| 2022/0102790 | A1 | 3/2022 | Jung et al. | |
| 2022/0109218 | A1 | 4/2022 | Park et al. | |
| 2022/0140425 | A1* | 5/2022 | Lee | H01M 50/184 429/185 |
| 2022/0158282 | A1 | 5/2022 | Kim et al. | |

FOREIGN PATENT DOCUMENTS

| | | | | |
|---|---|---|---|---|
| CN | 109950430 | A | 6/2019 | |
| JP | 2004071301 | A | 3/2004 | |
| JP | 2012221713 | A | 11/2012 | |
| KR | 20160031780 | A | 3/2016 | |
| KR | 20170002013 | A | 1/2017 | |
| KR | 20170053011 | A | 5/2017 | |
| KR | 20170062402 | A * | 6/2017 | H01M 10/049 |
| KR | 20180028200 | A * | 3/2018 | H01M 10/04 |
| KR | 20180029856 | A | 3/2018 | |
| KR | 101903367 | B1 | 10/2018 | |
| KR | 20190010434 | A | 1/2019 | |
| KR | 20190024755 | A | 3/2019 | |
| KR | 20190106473 | A | 9/2019 | |
| KR | 20200000321 | A | 1/2020 | |
| KR | 20200008834 | A | 1/2020 | |
| KR | 20200103473 | A | 9/2020 | |
| KR | 20200114784 | A | 10/2020 | |
| KR | 20200116247 | A | 10/2020 | |
| KR | 20200121644 | A | 10/2020 | |
| WO | 2019045329 | A1 | 3/2019 | |
| WO | 2019121332 | A1 | 6/2019 | |
| WO | 2020114708 | A1 | 6/2020 | |

OTHER PUBLICATIONS

"Lee, KR-2017-0062402-A—Machine Translated, Jun. 7, 2017" (Year: 2017).*

Extended European Search Report including Written Opinion for Application No. 21911177.0 dated Jun. 21, 2024, pp. 1-7.

Search Report dated Jan. 24, 2025 from the Office Action for Chinese Application No. 202180028438.9 Issued Jan. 27, 2025, pp. 1-3.

International Search Report for Application No. PCT/KR2021/010798 mailed Dec. 9, 2021, pp. 1-3.

* cited by examiner

SECONDARY BATTERY MANUFACTURING APPARATUS AND SECONDARY BATTERY MANUFACTURING METHOD USING SAME

CROSS-REFERENCE TO RELATED APPLICATIONS

The present application is a national phase entry under 35 U.S.C. § 371 of the International Application No. PCT/KR2021/010798 filed on Aug. 13, 2021, which claims priority from Korean Patent Application No. 10-2020-0183968, filed on Dec. 24, 2020, the disclosures of which are incorporated herein by reference in their entireties.

FIELD OF THE INVENTION

The present invention relates to a secondary battery manufacturing apparatus and a secondary battery manufacturing method using same. When accommodating an electrode assembly on one side of a pouch film and then folding the other side of the pouch film, the pouch film is made to fold while being in contact with each other as close as possible, thereby minimizing the occurrence of a bat-ear.

BACKGROUND OF THE INVENTION

Secondary batteries represent chargeable and dischargeable batteries unlike primary batteries that are not chargeable, and have been widely used in electronic devices such as mobile phones, laptop computers, and camcorders or power supplies for electric vehicles and the like.

In general, there are several types of secondary batteries such as nickel cadmium batteries, nickel hydrogen batteries, lithium ion batteries, and lithium ion polymer batteries. The secondary batteries have been applied to and used for not only small products such as digital cameras, laptop computers, mobile phones, PDAs, and E-bikes, but also large products requiring high power such as electric vehicles and hybrid vehicles, and power storage devices or backup-power storage devices for storing surplus generated power and new renewable energy.

The secondary batteries are classified into a pouch type, a can type, or the like according to a material of a battery case that accommodates an electrode assembly. In the pouch type, the electrode assembly is accommodated in a pouch made of a flexible polymer material that has an irregular shape. Also, in the can type, the electrode assembly is accommodated in a case made of a metal or plastic material or the like that has a predetermined shape.

The pouch-type battery case is manufactured by forming a cup portion through a drawing process on a flexible pouch film. In the drawing process, the pouch film is inserted into a press, and the pouch film is pressed by a punch. Accordingly, the pouch film is stretched to form the cup portion.

FIGS. 1 and 2 illustrate a secondary battery manufacturing apparatus according to the related art, and particularly, an apparatus for folding a pouch film is illustrated. Generally, in the secondary battery manufacturing apparatus, an electrode assembly is accommodated in an accommodation space of a cup portion, and subsequently, a pouch film is folded, and a sealing portion is sealed. Accordingly, a secondary battery is manufactured. When one side of the battery case is folded, edges required to be sealed may be reduced to enhance a process speed. Also, a trimming process may be reduced.

However, while the pouch film is folded, heated, and pressed to seal the battery case, an edge portion of the pouch film to be folded generally rotates and folds at the same place without horizontal movement. Thus, the pouch film slips in a state of being overlapped at a folding region and does not appropriately fold, and accordingly, gaps or irregularities occur. Also, in some cases, a portion of the pouch film protrudes outward. This is referred to as a bat-ear because the shape is similar to ears of a bat.

When the bat-ear is formed in the secondary battery pouch, the volume of the battery increases unnecessarily, and the energy density with respect to the volume is reduced. Also, an error occurs in the designed size, and a battery module is not easily assembled. When the dimension from the bottom surface of the battery to an end of a lead is measured, the measurement value for the position of the lead is distorted due to the length of the bat-ear. Furthermore, a crack occurs at a bat-ear portion when the module is assembled, and thus there is a need for a secondary battery manufacturing apparatus and a manufacturing method which can minimize the occurrence of bat-ears during the folding of the pouch.

BRIEF SUMMARY OF OF THE INVENTION

The present invention has been made to solve the above problems, and an object of the present invention is to provide a secondary battery manufacturing apparatus and a secondary battery manufacturing method. Here, when accommodating an electrode assembly on one side of a pouch film and then folding the other side of the pouch film, a rotating plate on which the other side of the pouch film is placed rotates and at the same time linearly moves toward a fixed plate on which the one side of the pouch film is placed. Thus, the pouch film is folded while being in contact with each other as close as possible, and accordingly, the occurrence of a bat-ear may be minimized.

A secondary battery manufacturing apparatus according to the present invention includes: a fixed plate on which one side of a pouch film is placed; a rotating plate which is provided on a side surface of the fixed plate and on which the other side of the pouch film is placed; and a rotation driving part which is coupled to the rotating plate and rotates the rotating plate to be above the fixed plate, wherein the rotating plate is rotated by the rotation driving part as well as linearly moves toward the fixed plate.

The rotating plate may linearly move toward the fixed plate simultaneously with or after the rotation by the rotation driving part.

The secondary battery manufacturing apparatus further may include: a fixed support part configured to support the fixed plate; and a moving support part configured to support the rotation driving part and the rotating plate coupled to the rotation driving part, wherein the rotating plate linearly moves toward the fixed plate as the moving support part linearly moves toward the fixed support part.

The secondary battery manufacturing apparatus may further include a linear driving part which is provided below the moving support part and linearly moves the moving support part toward the fixed support part.

The linear driving part may include a driving body configured to provide a driving force and a base linearly driven above the driving body, wherein the moving support part is coupled to the base and moves linearly.

The rotation driving part may include a servomotor or a cylinder.

The rotation driving part may be coupled to a side surface of the rotating plate.

The rotating plate may include a first rotating plate and a second rotating plate which are separated from each other and positioned on the same plane so that the other side of the pouch film is placed thereon, and the rotation driving part may include a first rotation driving part and a second rotation driving part which are coupled to the first rotating plate and the second rotating plate, respectively.

The secondary battery manufacturing apparatus may further include a body part which is provided below the fixed support part and the moving support part and has a die shape.

A secondary battery manufacturing method according to the present invention includes: placing a pouch film on a fixed plate and a rotating plate provided on a side surface of the fixed plate; folding the pouch film as a rotation driving part coupled to the rotating plate rotates the rotating plate to be above the fixed plate; and linearly moving the rotating plate toward the fixed plate.

The linearly moving may be performed simultaneously with the folding of the pouch film or after the folding of the pouch film.

In the linearly moving, the rotating plate may linearly move toward the fixed plate as a moving support part configured to support the rotation driving part and the rotating plate coupled to the rotation driving part linearly moves toward a fixed support part configured to support the fixed plate.

The linearly moving may be performed by a linear driving part which is provided below the moving support part and linearly moves the moving support part.

The linear driving part may include a driving body configured to provide a driving force and a base linearly driven above the driving body, wherein the linearly moving is performed as the moving support part is coupled to the base and moves linearly.

The secondary battery manufacturing apparatus according to the present invention includes the fixed plate on which the one side of the pouch film is placed, the rotating plate which is provided on the side surface of the fixed plate and on which the other side of the pouch film is placed, and the rotation driving part which is coupled to the rotating plate and rotates the rotating plate to be above the fixed plate. The rotating plate is rotated by the rotation driving part as well as linearly moves toward the fixed plate. Accordingly, when accommodating the electrode assembly on the one side of the pouch film and then folding the other side of the pouch film, the pouch film is folded while being in contact with each other as close as possible, and thus, the occurrence of a bat-ear may be minimized.

Figure 1:
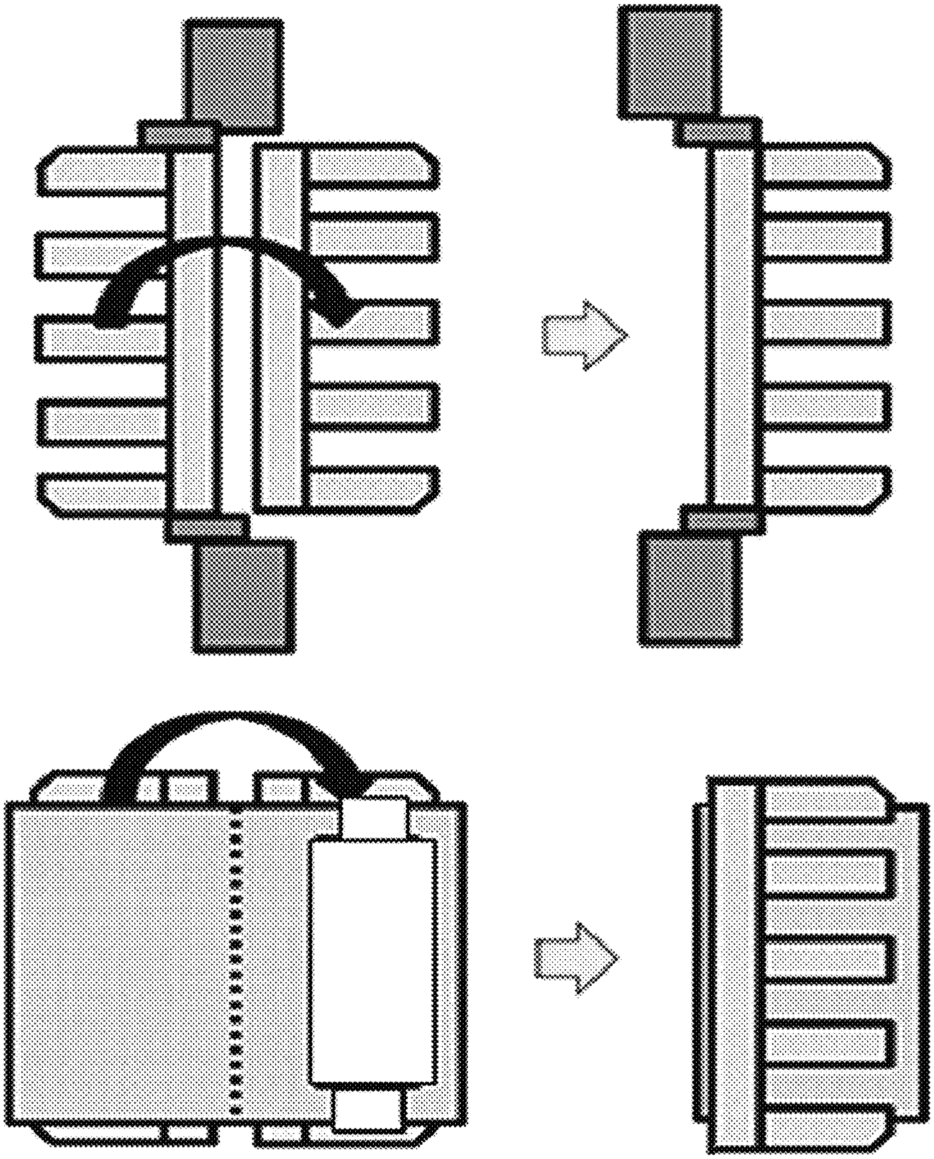
FIG.1 (PRIOR ART)
FIG. 1 is a plan view illustrating a secondary battery manufacturing apparatus and operation thereof according to the related art.
Figure 2:
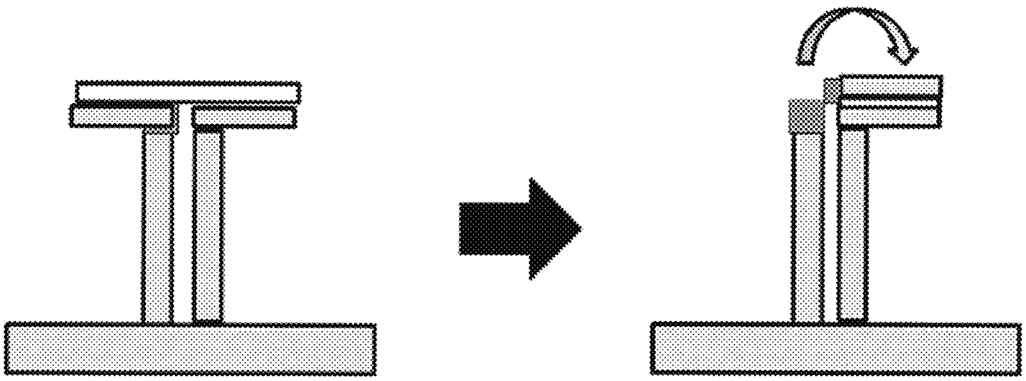
FIG.2 (PRIOR ART)
FIG. 2 is a side view illustrating the secondary battery manufacturing apparatus and the operation thereof according to the related art.

Hereinafter, preferred embodiments of the present invention will be described in detail with reference to the accompanying drawings so as to be easily carried out by a person skilled in the art to which the present invention pertains. However, the present invention may be embodied in various different forms, and is neither limited nor restricted to the following embodiments.

In order to clearly describe the present invention, parts irrelevant to the description are omitted, and descriptions related to well-known functions or configurations are ruled out so as not to unnecessarily obscure subject matters of the present invention. In the specification, when reference numerals are given to components in each of the drawings, the same or similar components will be designated by the same or similar reference numerals throughout the specification.

Also, terms or words used in this specification and claims should not be restrictively interpreted as ordinary meanings or dictionary-based meanings, but should be interpreted as meanings and concepts conforming to the technical ideas of the present invention on the basis of the principle that an inventor can properly define the concept of a term to describe his or her invention in the best ways.

Embodiment 1

Figure 3A:
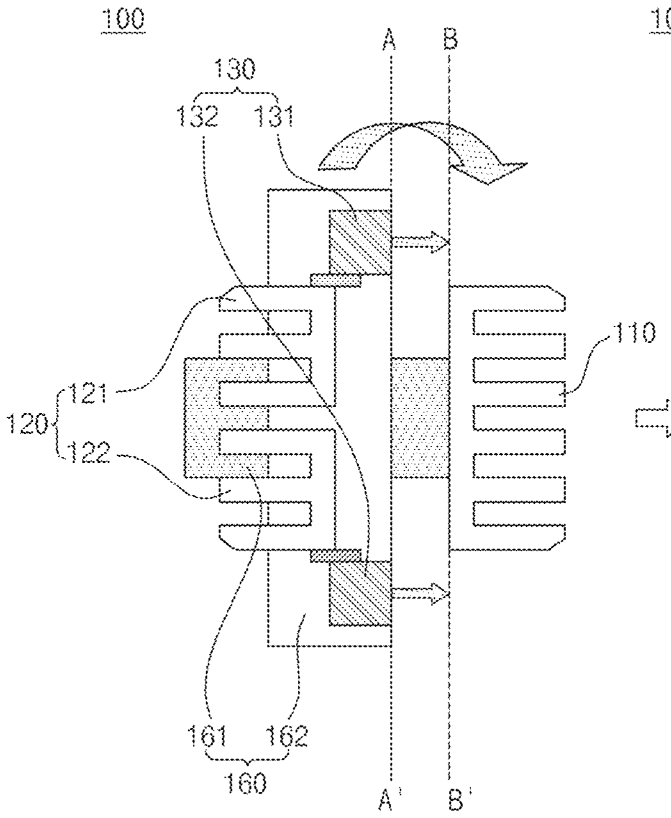
FIGS. 3A and 3B are plan views illustrating a secondary battery manufacturing apparatus and operation thereof according to Embodiment 1 of the present invention.
Figure 3B:
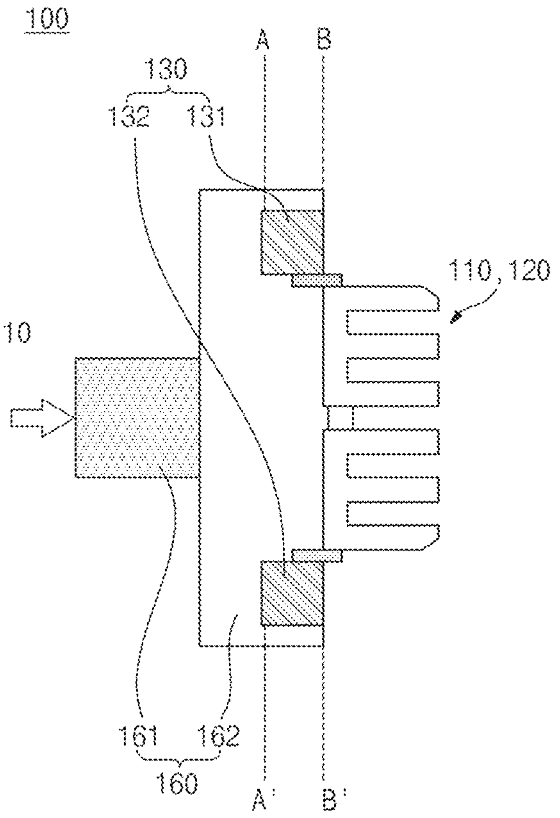
Figure 4A:
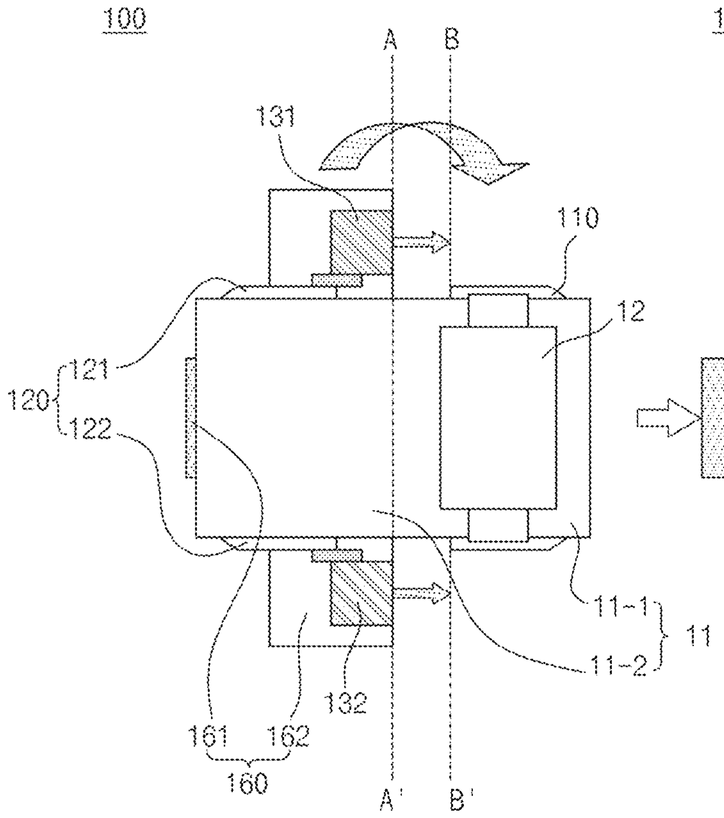
FIGS. 4A and 4B are plan views illustrating states in which a pouch film is placed and rotated in the secondary battery manufacturing apparatus according to Embodiment 1 of the present invention.
Figure 4B:
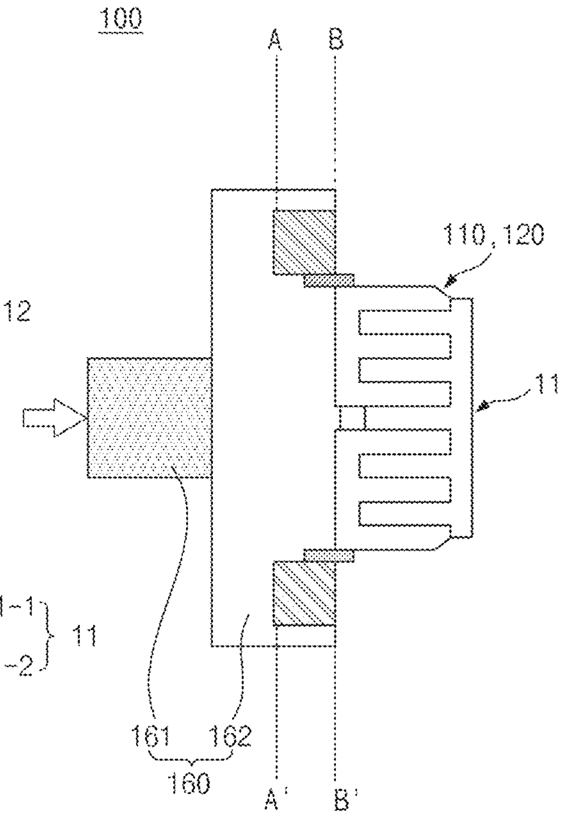
Figure 5A:
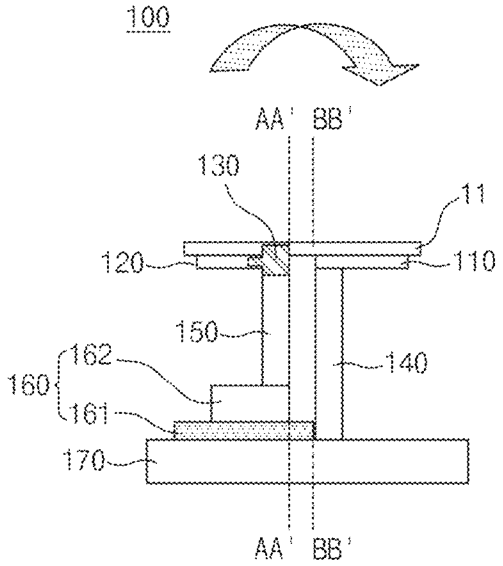
FIGS. 5A and 5B are side views illustrating the secondary battery manufacturing apparatus and the operation thereof according to Embodiment 1 of the present invention.
Figure 5B:
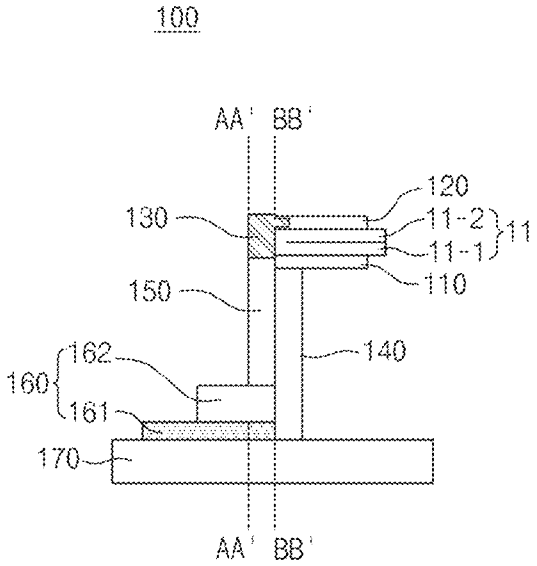

FIGS. 3A and 3B are plan views illustrating a secondary battery manufacturing apparatus and operation thereof according to Embodiment 1 of the present invention. FIGS. 4A and 4B are plan views illustrating states in which a pouch film is placed and rotated in the secondary battery manufacturing apparatus according to Embodiment 1 of the present invention. FIGS. 5A and 5B are side views illustrating the secondary battery manufacturing apparatus and the operation thereof according to Embodiment 1 of the present invention.

Referring to FIGS. 3A to 5B, a secondary battery manufacturing apparatus 100 according to Embodiment 1 of the present invention includes a fixed plate 110, a rotating plate 120, and a rotation driving part 130. The rotating plate 120 is rotated by the rotation driving part 130 as well as linearly moves toward the fixed plate 110. Hereinafter, each of the components will be described in detail.

First, the secondary battery manufacturing apparatus 100 according to Embodiment 1 of the present invention relates to an apparatus 100 for manufacturing a secondary battery. An electrode assembly 12 is accommodated in a cup portion formed on one side 11-1 of a pouch film, and the other side 11-2 of the pouch film is folded to form the secondary battery. A pouch film 11 may be formed by stacking a plurality of layers which are formed of materials such as polypropylene (PP), an aluminum foil, nylon, and polyethylene terephthalate (PET).

As illustrated in FIG. 3A and FIG. 4A, one side 11-1 of the pouch film is placed on the fixed plate 110. The rotating plate 120 is provided on a side surface of the fixed plate 110, and the other side 11-2 of the pouch film is placed thereon. The fixed plate 110 and the rotating plate 120 may have a flat plate shape or a shape in which a plurality of auxiliary frames are provided in a comb shape on a side surface of a main frame having the length, so that the pouch film 11 may be placed thereon.

As illustrated in FIG. 3B and FIG. 4B, the rotating plate 120 is driven to rotate to be above the fixed plate 110 and may fold the other side 11-2 of the pouch film placed on the rotating plate 120. The rotation driving part 130, which rotates the rotating plate 120 to be above the fixed plate 110, is coupled to the rotating plate 120. The rotation driving part 130 rotates the rotating plate 120 and the pouch film 11 together and folds the pouch film 11, and accordingly, a pouch is formed. The rotation driving part 130 includes a servomotor or a cylinder to provide a rotational force to the rotating plate 120, and may be coupled to the side surface of the rotating plate 120.

The rotating plate 120 may include a first rotating plate 121 and a second rotating plate 122, and the first rotating plate 121 and the second rotating plate 122 may be positioned separately from each other within the same plane so that the pouch film 11 is placed thereon. For example, the rotating plate 120 may be positioned as being separated into the first rotating plate 121 and the second rotating plate 122 with respect to a virtual line perpendicular to a rotation axis thereof. Also, the rotation driving part 130 may include a first rotation driving part 131 coupled to the first rotating plate 121 and a second rotation driving part 132 coupled to the second rotating plate 122.

In the secondary battery manufacturing apparatus 100 according to Embodiment 1 of the present invention, the rotating plate 120 is rotated by the rotation driving part 130 as well as linearly moves toward the fixed plate 110. Here, the linear movement of the rotating plate 120 toward the fixed plate 110 represents movement in a direction from AA' to BB' as illustrated in FIGS. 3A-3B and 4A-4B.

Figure 7A:
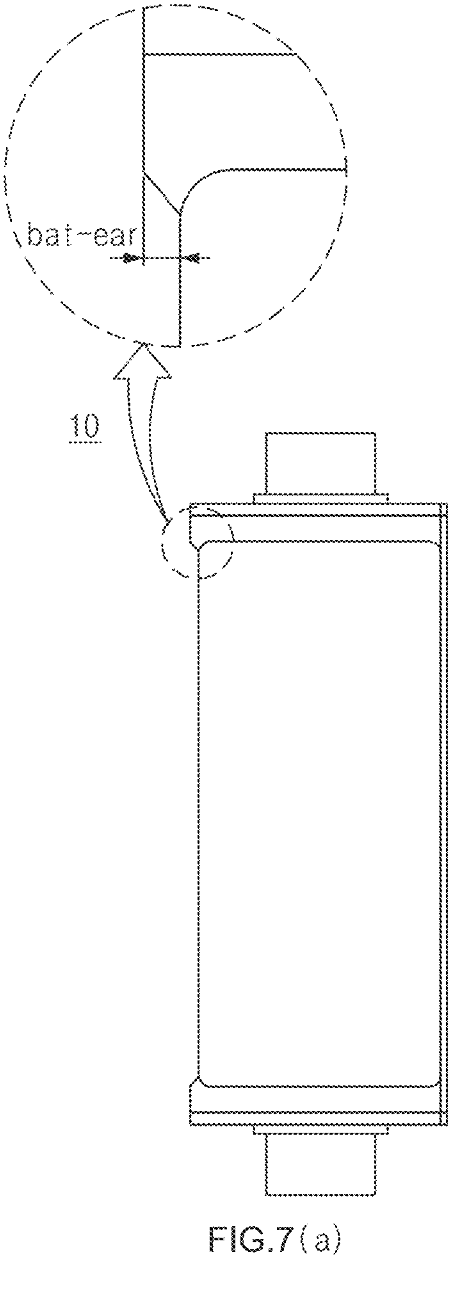
FIG. 7A is a view illustrating a secondary battery which is manufactured by a secondary battery manufacturing apparatus and a secondary battery manufacturing method according to the related art.
Figure 7B:
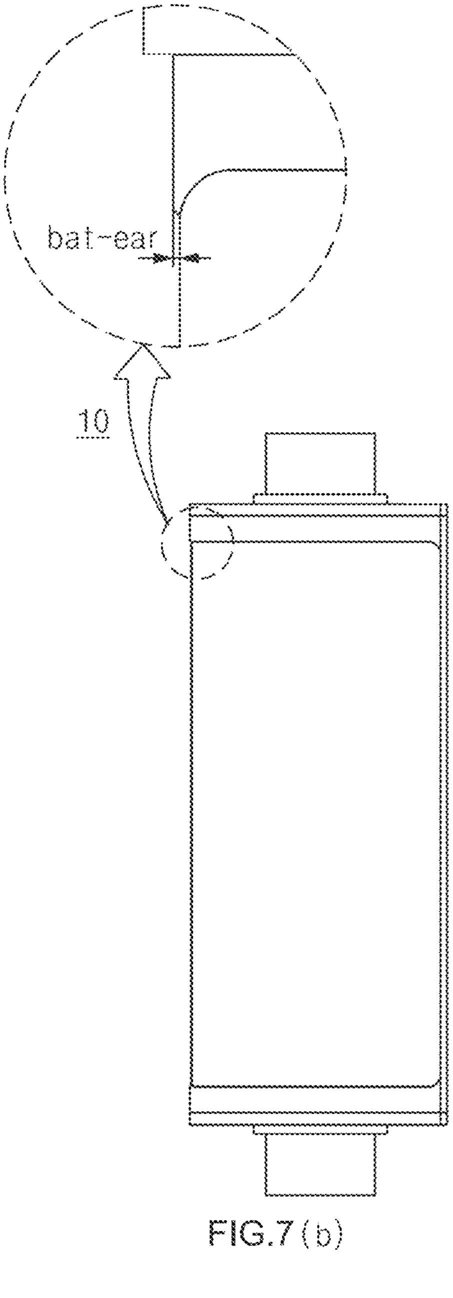
FIG. 7B is a view illustrating a secondary battery which is manufactured by the secondary battery manufacturing apparatus according to Embodiment 1 of the present invention and the secondary battery manufacturing method according to Embodiment 2.

The other side 11-2 of the pouch film is placed on the rotating plate 120. Also, due to the rotation of the rotating plate 120, the other side 11-2 of the pouch film is folded to be above the one side 11-1 of the pouch film placed on the fixed plate 110. In a secondary battery manufacturing apparatus according to the related art, a rotating plate is only rotated to be above a fixed plate. Thus, a pouch film having a thickness slips in a state of being overlapped at a folding region and does not appropriately fold, and accordingly, gaps or irregularities occur. Also, in some cases, a bat-ear in which a portion of the pouch film protrudes outward is formed. However, as in Embodiment 1 of the present invention, when the rotating plate 120 moves, while rotating, in a direction toward the fixed plate 110, which is a direction from AA' to BB', that is, toward the inside of a folding portion of the pouch film 11, the pouch film is folded in a state in which the other side of the pouch film is in contact with the one side thereof as close as possible as illustrated in FIG. 7B. Thus, the occurrence of the bat-ear may be minimized. However, when the linear movement of the rotating plate 120 occurs earlier, an effect of folding in a state in which the pouch film 11 is bent or in close contact may be reduced. Thus, the rotating plate 120 may linearly move toward the fixed plate 110 simultaneously with or after the rotation by the rotation driving part 130.

The rotating plate 120 may be provided with a slip-preventing means that prevents the pouch film 11 placed thereon from slipping. The slip-preventing means includes all of slip-preventing members or surface treatment for preventing slipping, and represents a means which is on the surface of the rotating plate 120 and increases a friction force applied on the pouch film 11 placed thereon. As described above, when the slip-preventing means is provided on the rotating plate 120, the pouch film 11 may be folded without slipping while being placed on the rotating plate 120 during the rotation of the rotating plate 120. Particularly, when the rotating plate 120 linearly moves as well as rotates, an effect of the forward movement of the other side 11-2 of the pouch film according to the linear movement of the rotating plate 120 may be maximized due to the friction force. A slip-preventing means may also be provided even on the fixed plate 110 together with the rotating plate 120. In this case, the effect of folding the pouch film 11 without slipping may occur in the same manner as the case where the slip-preventing means is provided on the rotating plate 120.

Referring to FIGS. 5A-5B, the secondary battery manufacturing apparatus 100 according to Embodiment 1 of the present invention may further include a fixed support part 140 that supports the fixed plate 110 and a moving support part 150 that supports the rotation driving part 130 and the rotating plate 120 coupled to the rotation driving part 130. The fixed support part 140 and the moving support part 150 may have various shapes and materials such as a metal frame and plywood, and anything is possible as long as it plays a role in supporting the fixed plate 110 and the rotating plate 120 from below. The moving support part 150 may be coupled to both the rotating plate 120 and the rotation driving part 130 so as to support the same, or may not be directly coupled to the rotating plate 120 but directly coupled to only the rotation driving part 130 coupled to the rotating plate 120 so as to support the same.

The rotating plate 120 may linearly move toward the fixed plate 110 as the moving support part 150 linearly moves toward the fixed support part 140. The rotating plate 120 folds the pouch film 11 while rotating as well as linearly moving. The rotation driving part 130 provides a rotational force, and the moving support part 150 supporting the rotation driving part 130 from below linearly moves. Accordingly, the rotating plate 120 coupled to the rotation driving part 130 may simultaneously perform the rotational motion and linear motion. As described above, powers for the rotational motion and linear motion are individually provided to the rotating plate 120, and thus, the rotational motion and linear motion may be easily regulated as needed. Also, the pouch film 11 may be folded in a state in which one side and the other side are in contact with each other as close as possible.

The secondary battery manufacturing apparatus 100 according to Embodiment 1 of the present invention may further include a linear driving part 160 which is provided below the moving support part 150 and linearly moves the moving support part 150 toward the fixed support part 140. The linear driving part 160 is a device that provides power so as to enable the linear motion, and for example, may be a Cartesian robot. The linear driving part 160 may include a driving body 161 providing a driving force and a base 162 linearly driven above the driving body 161. The moving support part 150 may be coupled to the base 162 and move linearly. The base 162 may play a role in stably supporting the moving support part 150 while providing the power of the driving body 161 above the driving body 161, and particularly when the moving support part 150 is formed of a plurality of parts, may play a role in providing the same power from one driving body 161 to the plurality of moving support parts 150.

A body part 170 may be included below the fixed support part 140 and the moving support part 150. The body part 170 is formed in a die shape and supports the fixed support part 140 and the moving support part 150 from below. Particularly, when the secondary battery manufacturing apparatus 100 according to Embodiment 1 of the present invention further includes the linear driving part 160, the linear driving part 160 is provided above the body part 170, and the moving support part 150 is provided above the linear driving part 160. Thus, the movement of the rotating plate 120 may be stably performed.

Embodiment 2

Figure 6:
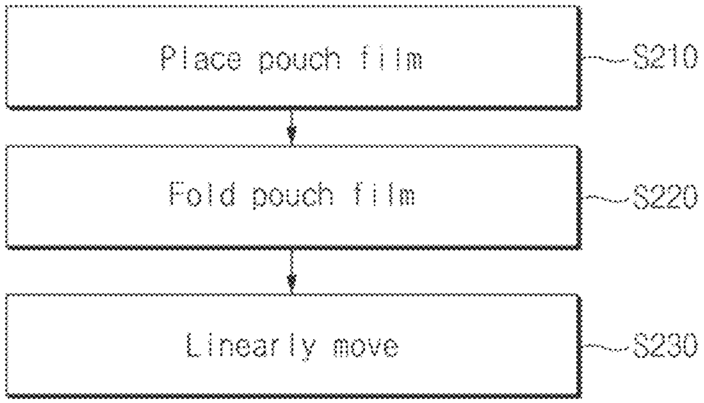
FIG. 6 is a flowchart illustrating a secondary battery manufacturing method according to Embodiment 2 of the present invention.

FIG. 6 is a flowchart illustrating a secondary battery manufacturing method according to Embodiment 2 of the present invention.

Embodiment 2 of the present invention is different from Embodiment 1 in that a method for manufacturing a secondary battery using the secondary battery manufacturing apparatus 100 of Embodiment 1 is provided.

Embodiment 2 will be described with a focus on the differences, and the features common to Embodiment 1 will be omitted as much as possible. That is, it is obvious that features not described in Embodiment 2 may be regarded as the features of Embodiment 1 if necessary.

Referring to FIG. 6, the secondary battery manufacturing method according to Embodiment 2 of the present invention includes a pouch film placing process (S210), a pouch film folding process (S220), and a linearly moving process (S230). Each of the processes will be described below in detail with reference to FIGS. 3A to 7B.

In the process (S210) of placing a pouch film, a pouch film 11 is placed on a fixed plate 110 and a rotating plate 120 provided on a side surface of the fixed plate 110. Subsequently, in the process (S220) of folding the pouch film, a rotation driving part 130 coupled to the rotating plate 120 rotates the rotating plate 120 to be above the fixed plate 110, and the pouch film 11 is folded by the rotation of the rotating plate 120. In the process (S230) of linearly moving, the rotating plate 120 linearly moves toward the fixed plate 110. Here, the linear movement of the rotating plate 120 toward the fixed plate 110 represents movement in a direction from AA' to BB' as illustrated in FIGS. 3 and 4. Accordingly, when the other side 11-2 of the pouch film is folded to one side 11-1 of the pouch film, the pouch film 11 is folded while being in contact with each other as close as possible as illustrated in FIG. 7(*b*). Thus, the occurrence of a bat-ear may be minimized in a secondary battery 10.

When the linearly moving process (S230) is conducted earlier than the pouch film folding process (S220), an effect of folding in a state in which the pouch film 11 is bent or in close contact at a folding region may be reduced. In order to prevent this, the linearly moving process (S230) may be performed simultaneously with the pouch film folding process (S220) or after the pouch film folding process (S220).

Describing the linearly moving process (S230) in detail, a moving support part 150 that supports the rotation driving part 130 and the rotating plate 120 coupled to the rotation driving part 130 linearly moves toward a fixed support part 140 that supports the fixed plate 110 in the linearly moving process (S230), and accordingly, the rotating plate 120 may linearly move toward the fixed plate 110. The rotating plate 120 folds the pouch film 11 while rotating as well as linearly moving. The rotation driving part 130 provides a rotational force, and the moving support part 150 supporting the rotation driving part 130 from below linearly moves. Accordingly, the rotating plate 120 coupled to the rotation driving part 130 may simultaneously perform the rotational motion and linear motion. As described above, powers for the rotational motion and linear motion are individually provided to the rotating plate 120, and thus, the rotational motion and linear motion may be easily regulated as needed. Also, the pouch film 11 may be folded in a state in which one side and the other side are in contact with each other as close as possible.

Also, the linearly moving process (S230) may be performed by the linear driving part 160, and the linear driving part 160 may be a component which is provided below the moving support part 150 and linearly moves the moving support part 150. The linear driving part 160 may include a driving body 161 providing a driving force and a base 162 linearly driven above the driving body 161. The moving support part 150 may be coupled to and linearly move with the base 162. The base 162 may play a role in stably supporting the moving support part 150 while providing the power of the driving body 161 above the driving body 161, and particularly when the moving support part 150 is formed of a plurality of parts, may play a role in providing the same power from one driving body 161 to the plurality of moving support parts 150.

Although the present invention is described by specific embodiments and drawings, the present invention is not limited thereto, and various changes and modifications may be made by a person skilled in the art to which the present invention pertains within the technical idea of the present invention and equivalent scope of the appended claims.

DESCRIPTION OF THE SYMBOLS

10: Secondary battery
11: Pouch film
11-1: One side of pouch film
11-2: The other side of pouch film
12: Electrode assembly
100: Secondary battery manufacturing apparatus
110: Fixed plate
120: Rotating plate
121: First rotating plate
122: Second rotating plate
130: Rotation driving part
131: First rotation driving part
132: Second rotation driving part
140: Fixed support part
150: Moving support part
160: Linear driving part
161: Driving body
162: Base
170: Body part
S210: Pouch film placing process
S220: Pouch film folding process
S230: Linearly moving process

The invention claimed is:

1. A secondary battery manufacturing apparatus comprising:

a fixed plate on which a first side of a pouch film is configured to be placed, the fixed plate extending in a first plane in a first direction;

a rotating plate provided on a side surface of the fixed plate and on which a second side of the pouch film is configured to be placed, the rotating plate configured to assume at least a first position in which the rotating plate extends in the first plane in a second direction opposite the first direction and a second position in which the rotating plate rests on the fixed plate;

a rotation driving part coupled to the rotating plate and configured to rotate the rotating plate to be above the fixed plate;

a fixed support part configured to support the fixed plate; and a moving support part configured to support the rotation driving part and the rotating plate coupled to the rotation driving part, the moving support part configured to support the rotating plate in the first position, wherein the rotating plate is configured to be rotated by the rotation driving part as well as to linearly move along the first plane toward the fixed plate, and wherein the rotating plate is configured to be linearly move toward the fixed plate as the moving support part linearly moves toward the fixed support part.

2. The secondary battery manufacturing apparatus of claim 1, wherein the rotating plate is configured to be linearly move toward the fixed plate simultaneously with or after the rotation by the rotation driving part.

3. The secondary battery manufacturing apparatus of claim 1, further comprising a linear driving part provided below the moving support part and configured to be linearly move the moving support part toward the fixed support part.

4. The secondary battery manufacturing apparatus of claim 3, wherein the linear driving part comprises a driving body configured to provide a driving force and a base linearly driven above the driving body, wherein the moving support part is coupled to the base and is configured to move linearly.

5. The secondary battery manufacturing apparatus of claim 1, wherein the rotation driving part comprises a servomotor or a cylinder.

6. The secondary battery manufacturing apparatus of claim 1, wherein the rotation driving part is coupled to a side surface of the rotating plate.

7. The secondary battery manufacturing apparatus of claim 1, wherein the rotating plate comprises a first rotating plate and a second rotating plate which are separated from each other and positioned on the same plane so that the second side of the pouch film is configured to be placed thereon, and the rotation driving part comprises a first rotation driving part and a second rotation driving part coupled to the first rotating plate and the second rotating plate, respectively.

8. The secondary battery manufacturing apparatus of claim 1, further comprising a body part provided below the fixed support part and the moving support part and having a die shape.

* * * * *